(12) United States Patent
Snelling et al.

(10) Patent No.: US 6,948,364 B2
(45) Date of Patent: Sep. 27, 2005

(54) APPARATUS FOR DETECTING THE INTERNAL LIQUID LEVEL IN A VESSEL

(75) Inventors: Charles D. Snelling, Fogelsville, PA (US); Leo T. Van Lahr, Glendora, CA (US)

(73) Assignee: Charles Snelling, Fogelsville, PA (US)

( * ) Notice: Subject to any disclaimer, the term of this patent is extended or adjusted under 35 U.S.C. 154(b) by 471 days.

(21) Appl. No.: 09/819,943

(22) Filed: Mar. 28, 2001

(65) Prior Publication Data

US 2002/0011105 A1 Jan. 31, 2002

Related U.S. Application Data

(63) Continuation-in-part of application No. 09/368,337, filed on Aug. 3, 1999.

(51) Int. Cl.[7] ............................................. G01F 23/22
(52) U.S. Cl. ....................... 73/295; 73/290 R; 702/55; 340/622
(58) Field of Search ............................. 73/290 R, 295, 73/204.11; 374/16, 45, 54; 340/622; 702/55

(56) References Cited

U.S. PATENT DOCUMENTS

| | | | |
|---|---|---|---|
| 3,161,050 A | 12/1964 | Exner | 73/295 |
| 3,461,446 A | 8/1969 | Sergeant | 340/244 |
| 3,485,100 A * | 12/1969 | Petersen | 73/295 |
| 3,696,675 A | 10/1972 | Gilmour | 73/295 |
| 3,911,564 A * | 10/1975 | Marcoux | 29/611 |
| 4,036,053 A | 7/1977 | Jenkins | 73/204 |
| 4,065,967 A | 1/1978 | Beeston | 73/295 |
| 4,089,209 A | 5/1978 | Grana et al. | 73/61 R |
| 4,135,186 A | 1/1979 | Minorikawa et al. | 340/622 |
| 4,248,087 A | 2/1981 | Dennis et al. | 73/290 V |
| 4,358,955 A | 11/1982 | Rait | 73/295 |
| 4,425,795 A * | 1/1984 | Albrecht et al. | 702/53 |
| 4,466,282 A * | 8/1984 | Kuhnel | 73/295 |
| 4,513,616 A | 4/1985 | Bezard et al. | 73/295 |

(Continued)

OTHER PUBLICATIONS

"Accu–Level® Propane Tank Gauge", Hammerhead Tower, Inc., 1988–1996, 1 page.
U.S. Appl. No. 09/080,689, filed May 18, 1998, abandoned Jul. 7, 1999.

Primary Examiner—Michael Cygan

(57) ABSTRACT

The liquid level detector system of the present invention comprises a heater thermally coupled to the interior of the vessel. A linear sensor, having a vertical longitudinal axis, is located in proximity to the heater such that discrete elevations of the interior of the vessel are thermally coupled to corresponding longitudinal portions of the sensor. The correspondence is incrementally continuous such that the elevations corresponding to the portions of the sensor increase from one to the other end of the sensor. The sensor may be actuated resulting in a resistance measurement indicative of the temperature detected by it. The vertical dimension of the sensor is sufficiently large such that the resistance measurement will vary in proportion to the longitudinal portion of the sensor thermally coupled to the liquid. The sensor generates an electrical signal defining a temperature signal indicative of the resistance measurement and thereby the temperature detected by the sensor. A processor is electrically connected to the sensor for receiving and measuring the temperature signal after actuation of the heater. The processor is programmed to use the temperature signal to calculate the elevation of the upper surface of the liquid in the vessel.

4 Claims, 4 Drawing Sheets

U.S. PATENT DOCUMENTS

| | | | |
|---|---|---|---|
| 4,590,797 A | 5/1986 | Beaubatie et al. | 73/295 |
| 4,609,913 A | 9/1986 | Arbogast et al. | 340/622 |
| 4,665,385 A | 5/1987 | Henderson | 340/539 |
| 4,720,997 A | 1/1988 | Doak et al. | 23/295 |
| 4,774,838 A | 10/1988 | Rickson et al. | 73/295 |
| 4,796,471 A | 1/1989 | Sabin | 73/295 |
| 4,845,486 A | 7/1989 | Knight et al. | 340/618 |
| 5,023,806 A | 6/1991 | Patel | 364/509 |
| 5,092,170 A | 3/1992 | Høonstvet et al. | 73/295 |
| 5,167,154 A | 12/1992 | Lee | 73/295 |
| 5,174,153 A | 12/1992 | Nakano | 73/295 |
| 5,209,115 A | 5/1993 | Bond | 73/295 |
| 5,234,527 A * | 8/1993 | Nozawa et al. | 118/663 |
| 5,297,393 A | 3/1994 | Thompson | 62/129 |
| 5,323,652 A | 6/1994 | Parker | 73/295 |
| 5,719,332 A * | 2/1998 | Wallrafen | 340/622 |
| 5,730,026 A | 3/1998 | Maatuk | 73/295 |
| 5,782,131 A * | 7/1998 | Lord et al. | 374/54 |
| 5,908,985 A | 6/1999 | Maatuk | 73/295 |

* cited by examiner

APPARATUS FOR DETECTING THE INTERNAL LIQUID LEVEL IN A VESSEL

This application is a continuation-in-part patent application of U.S. patent application Ser. No. 09/368,337, filed Aug. 3, 1999, and a continuation-in-part patent application of U.S. patent application Ser. No. 09/800,259, filed Mar. 6, 2001, titled "Internal Liquid Level Detector System", naming as inventor "Charles D. Snelling".

BACKGROUND OF THE INVENTION

The present invention relates generally to liquid level detection systems and, more particularly, to a system for accurately measuring the depth of liquid contained within the vessel and a method for operating such a sensor.

Certain substances, which are in a gaseous state at normal atmospheric temperature and pressure, are advantageously stored under higher than atmospheric pressure in high strength vessels. The advantage of such storage is that such substances liquefy under a suitably high pressure and therefore occupy less volume thereby requiring correspondingly less storage space. Substances, which have these thermodynamic properties, include propane LPG and at lowered temperatures natural gas (sometimes referred to as liquefied natural gas or LNG), both of which are used in home heating and industrially. In each of these applications, storage of the gas in a minimum of space is desirable. Containers capable of maintaining the necessary elevated pressure and in some cases reduced temperatures for these materials include cylindrical vessels with dished closed ends fabricated using materials such as aluminum or steel.

Ever increasing demands for the efficient management of these materials make accurate measurement of propane or (LNG) natural gas, in a container desirable. A suitably accurate measurement may be obtained by determining ratio of the volume of liquid and vapor in the container. The volume of liquid can be readily determined from its depth since the interior geometry and volume of the aforementioned storage vessel is fixed.

SUMMARY OF THE INVENTION

The liquid level detector system of the present invention comprises a sensor located in close proximity to the elevations of the interior liquid of the vessel and thermally connected to corresponding longitudinal portions of the sensor. The correspondence between the sensor resistance and the liquid level is incrementally continuous, such that the elevations corresponding to the portions of the sensor increase from one to the other end of the sensor. A heater may be actuated to deliver heat along the longitudinal portions of the sensor. The sensor generates an electrical signal defining a temperature signal. The sensor has a vertical dimension sufficiently large such that the temperature signal will vary in proportion to the longitudinal portion of the sensor thermally connected to the liquid. A processor is electrically connected to the sensor for receiving the temperature signal after actuation of the heater. The processor is programmed to use the temperature signal to calculate the elevation of the upper surface of the liquid in the vessel.

The present invention enables an accurate measurement of the depth of the liquid, i.e., elevation of the upper surface of the liquid, in a vessel over a continuous range of elevations between an upper and lower limits of the sensor. Measurement of the elevation over a continuous range provides for increased accuracy in the measurement. Having the specific elevation of the liquid and the tank geometry, a processor may be programmed for precise determinations of the quantity of gas in the tank. Such increased accuracy has numerous beneficial applications such as where a precise determination of the amount of liquid present in a vessel, of liquid volume added to a vessel, and of liquid removed from the vessel, is necessary. This increased precision will enable the determination of liquid usage from the tank supporting the invoicing of a residential or commercial consumer for liquid usage not the amount of liquid delivered. Such precision may also be necessary to determine the amount liquid used by a device being supplied with liquid from the vessel, e.g., for a determination of the energy efficiency of a device supplied with liquid from the vessel.

The generation by the sensor of the present invention of a temperature signal indicative of the elevation of the upper surface of the liquid provides further advantages. For example, the elevation may be measured at a location remote from the vessel thereby making unnecessary traveling to the actual vessel for the measurement. Also, the elevation of the liquid in more than one vessel may be detected at a single location thereby enabling a central control and monitoring location for multiple vessels. Furthermore, the detection may be made in a very short period of time and after thereby facilitating prevention of run-out or emptying of the liquid from the vessel. Additionally, the detection may be continuous and recorded to provide, e.g., for monitoring of usage patterns and validation of invoicing.

These and other features and advantages of the invention will be more fully understood from the following description of specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION

The liquid level detector system 20 of the present invention advantageously uses the thermodynamic characteristics of a liquid and vapor mixture in thermodynamic equilibrium contained in a closed vessel 22 under pressure. More specifically, in a closed vessel containing liquid and vapor at an elevated pressure, the liquid and vapor are normally at equilibrium. When heat is applied to a localized volume of liquid adjacent to the sensor in the vessel, the liquid is vaporized, absorbing heat, thereby resisting any temperature change in the proximity of the sensor. As the vapor condenses back to a liquid, the absorbed heat is distributed throughout the system. By this mechanism, large amounts of heat may be removed from the sensor at a relatively constant rate. It has also been found that the temperature of the vessel will not rise appreciably as long as the vessel is sufficiently large that the total surface of the vessel can easily dissipate the heat added at the point source. Provided there is liquid adjacent the heat source, the temperature at the heat source remains relatively constant. Under these conditions, neither the overall temperature of the system nor its pressure rise significantly.

Accordingly, upon applying heat to a selected volume of liquid in the vessel adjacent to the sensor for a relatively short period of time, the liquid acts as a refrigerant, thereby limiting the temperature rise to a relatively small amount. If the vessel contains propane at equilibrium with its vapor, a few degree increase in temperature causes it to boil, acting like a refrigerant, efficiently carrying the heat away from the sensor.

In contrast, applying heat to a selected volume of vapor adjacent to the sensor in the vessel for a relatively short period of time causes the temperature of the sensor to increase by an amount which is noticeably greater than any temperature increase resulting from application of heat to the sensor adjacent to the liquid in the vessel. This noticeable difference results from the vapor being a much less effective remover of heat, as compared to liquid, because vapor does not carry away heat as effectively as liquid. The reduced effectiveness of vapor as a remover of heat, relative to liquid, results from the absence of a phase or state change by the vapor upon application of heat and its much lower specific heat, as compared to liquid.

Figure 2:
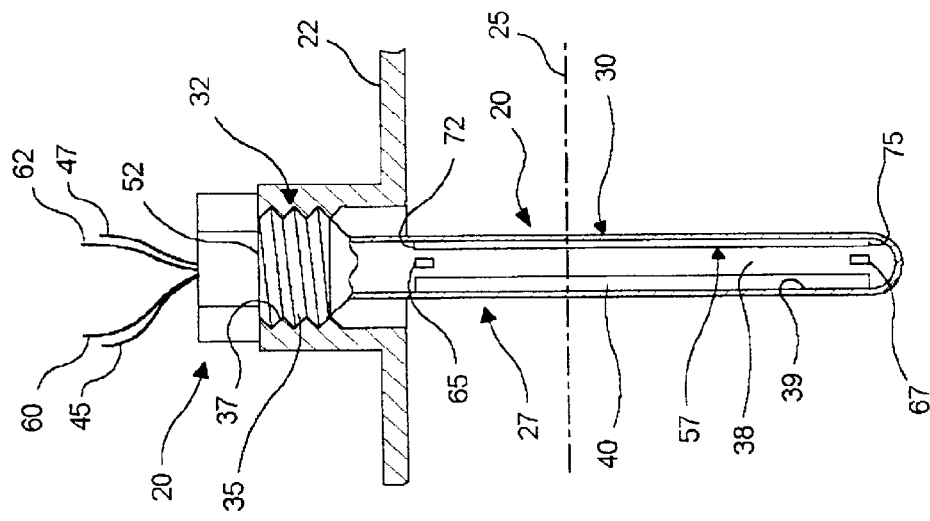
FIG. 2 is an enlarged elevation view of the system of FIG. 1 showing the upper, intermediate and lower sensors and the heater.
Figure 1:
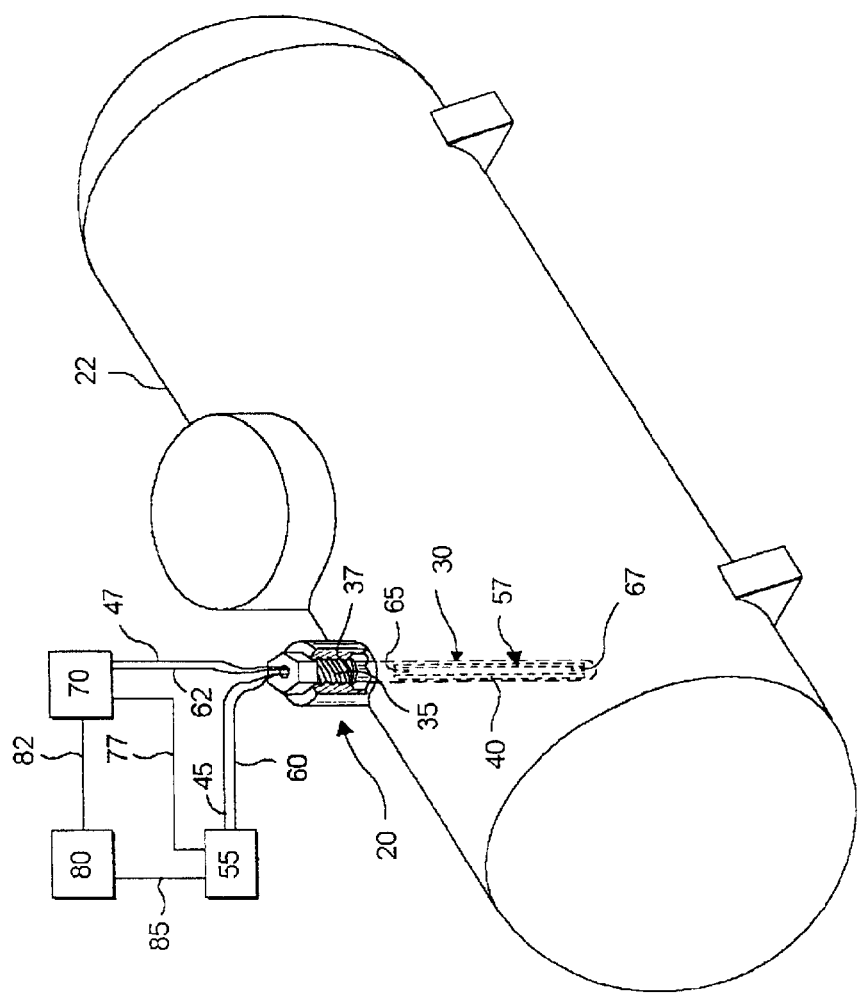
FIG. 1 is a perspective view of a liquid level detector system of the present invention mounted within a storage vessel.
Figure 3:
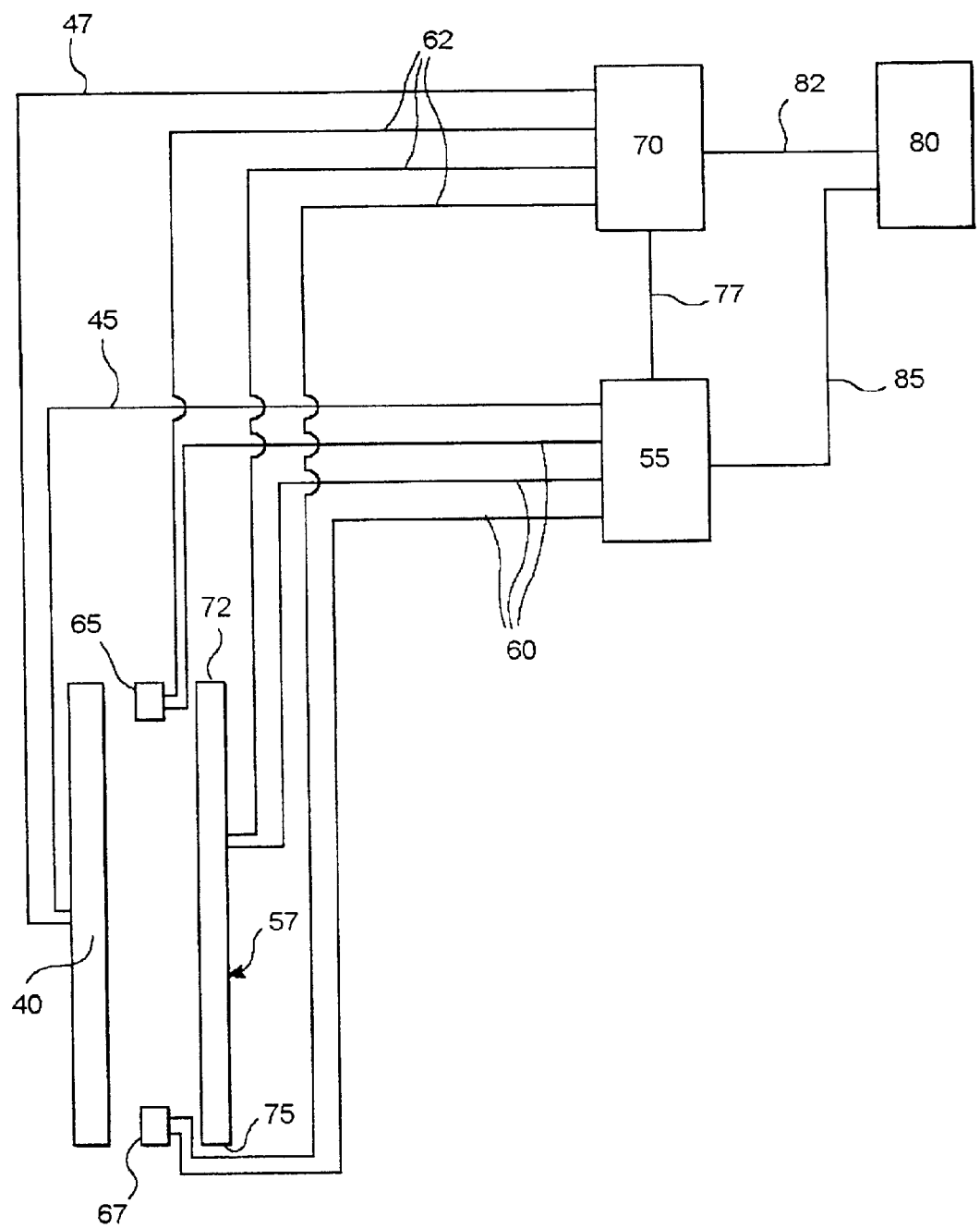
FIG. 3 is a schematic diagram showing the electrical conduits for connecting the sensors, power supply, processor and interface of FIG. 1.

Referring to the drawings and more particularly to FIG. 1 and FIG. 2, the liquid level detector system 20 of the present invention is shown mounted within a storage vessel 22 for detecting the elevation of the upper surface 25 of a fluid, such as propane, contained in the vessel. The vessel 22 may be a horizontally disposed propane tank such as is shown in FIG. 1 having about a 200 to 1,000 gallon capacity. The system 20 is illustrated with the detector assembly inside the vessel 22.

An alternative embodiment of the system 20 may be mounted on the outer surface of the vessel 22 according to the present invention. One such embodiment for mounting the system 20 on the outer surface of the vessel 22 may utilize the disclosure of U.S. patent application Ser. No. 09/368,337, filed Aug. 3, 1999. Other mountings for supporting the system 20 of the present invention on the outer surface of the vessel 22 may be used.

As shown in FIG. 1, the system 20 comprises a detector assembly 27 including an elongate thermally conductive substrate which may be constituted by a tubular housing 30 formed of metal, a thermally conductive material. The detector assembly 27 also includes a port 32 for supporting the housing 30 within the vessel 22 such that the housing has portions with different elevations. One preferable embodiment of the housing 30 has an externally threaded upper plug 35 which is screwed into corresponding internal threads of a port 37 through the upper surface of the vessel 22. The threaded end and port 35, 37 thereby constitute the support means for the housing 30. The portion of the housing 30 below the threaded end 35 has a diameter which is less than that of the port 37 to facilitate insertion of the housing 30 from above the vessel 22 downward through the port 37. The housing 30 has a longitudinal interior passage 38 bounded longitudinally by an inner surface 39. The housing 30 may be referred to as a "dip-tube".

The heater 40 is mounted on the housing 30 such that heat from the element is thermally connected to the interior of the vessel 22 in which liquid and vapor is contained. In FIG. 1, the heater 40 is illustrated as a strip fixed to the inner surface 39 of the tubular housing 30 by epoxy or other conduction means.

Accordingly, the heater 40 does not directly contact the liquid or vapor within the vessel 22. Electrical conduits 45, 47 extend from the heater 40 through the interior passage 38 of the housing 30 upwardly through the access opening 52 in the upper end 35. The conduit 45 is electrically connected to an electrical power supply 55 for actuating the heater 40. The conduits 45, 47 may each comprise one or more wires.

The heater 40 comprises a strip heater fixed to the inner surface 39 of the tubular housing 30 and is aligned longitudinally therewith. Application of an electrical current to the resistive material for the heater 40 will cause the housing 30 to become heated. A sensor 57 is mounted on the housing 30 in proximity to the heater 40. The sensor 57 is fixed to the inner surface 39 of the tubular housing 30 by epoxy or other conduction means. Accordingly, the sensor 57 does not directly contact the liquid or vapor within the vessel 22. The sensor 57 comprises a potentiometer in which the resistance to electrical conductivity varies in proportion to the temperature detected by the sensor. The temperature can be determined by measuring the resistance using a full bridge (Wheatstone Bridge) or a half bridge. In either configuration a three-wire connection to the bridge is used. The sensor 57 has a respective electrical conduits 60, 62 extending through the interior passage 38 of the housing 30 upwardly through the access opening 52 in the upper end 35. The conduits 60, 62 may each comprise two or more wires.

The sensor 57 must be able to withstand the operating temperatures in the range of −40° F. and 120° F. and pressure and maintain close thermal contact with the contents of the tank.

The sensor 57 is constructed using a linear material of known resistive temperature coefficient that runs the length of the sensor. The ideal material would have high resistive coefficient to temperature and a linear change of resistance with temperature. A good compromise material is nickel wire, it can be fabricated into a 100 Ω resistance at room temperature, has a high temperature coefficient and its characteristics are determinant. Other materials such as copper and platinum are also common construction materials. The sensor 57 may be referred to as an "average temperature probe" and is referred to in the industry as the "average reading temperature probe".

The mounting of the sensor 57 on the housing 30 provides for resolution of discrete elevations of the interior of the vessel 22 being thermally connected to corresponding longitudinal portions of the sensor. The correspondence between the sensor 57 and the discrete elevations is incrementally continuous such that the elevations corresponding to the portions of the sensor covered by the liquid may be resolved. The sensor 57 may be actuated to produce an electrical signal equal to the electrical resistance of the sensor and thereby indicative of the temperature detected by it. The sensor 57 has a vertical dimension sufficiently large such that the temperature signal will vary in proportion to the longitudinal portion of the sensor thermally connected to liquid.

Preferably, the sensor 57 is disposed between upper and lower sensors 65, 67. The upper sensor 65 may be positioned at an elevation which is just above the highest expected elevation of the liquid upper surface 25. For such an embodiment, the sensor 57 constitutes an intermediate sensor. The upper and lower sensors 65, 67 each have a vertical dimension generally equivalent to a single longitudinal portion of the intermediate sensor 57. For convenience, the upper and lower sensors 65, 67 may have the same resistance as the intermediate sensor 57, e.g., a resistance of 100 Ω at 25° C. Also for convenience, the upper and lower sensors 65, 67 may be made of the same material as the intermediate sensor 57. In an alternative embodiment, the sensors 65, 67 may also constitute the heater 40 by applying a suitable electric current the sensors before measuring their respective resistances, i.e., temperatures.

The upper and lower sensors 65, 67 are each mounted on the housing 30 in proximity to the ends of heater 40. The sensors 65, 67 are each fixed to the inner surface 39 of the tubular housing 30 by epoxy or other conduction means. Accordingly, neither of the sensors 65, 67 directly contact the liquid or vapor within the vessel 22. The sensors 65, 67 each comprise a potentiometer in which the resistance to electrical conductivity varies in proportion to the temperature detected by each sensor. The sensors 65, 67 each have respective electrical conduits 60, 62 extending through the interior passage 38 of the housing 30 upwardly through the access opening 52 in the upper end 35. Each of the sensors 65, 67 may be actuated to produce an electrical signal equal to the electrical resistance of the respective sensors and thereby indicative of the temperatures detected by each.

The system 20 includes a processor 70 electrically connected, by the electrical conduits 62, to the sensors 57, 65, 67 for receiving the respective temperature signals resulting from actuation of the heater 40.

The primary method for operating the system 20 to detect the elevation of the liquid upper surface 25 in the vessel 22 includes actuating the heater 40 to add heat to the housing 30 adjacent to the sensor. The heater 40 will be operated so as to add a known quantity of heat (Joules) to the detector assembly 27. The temperature of the sensor 57 below the liquid level will change little and can considered to be zero. The portion of the sensor 57 above the liquid level 25 will change a known number of degrees, based on having applied a known number of Joules by the heater 40. The resultant resistance of the intermediate sensor 57 and the upper and lower sensors 65, 67 after the increase in the temperature produced by the heater 40 will be used to determine the liquid level. The temperature signals are transmitted from the sensors 57, 65, 67 to the processor 70. The resistance, e.g., temperature, measured by the upper and lower sensors 65 and 67 will be scaled by dividing by an arbitrary number of increments, and then multiplied by the corresponding longitudinal portions of the intermediate sensor 57 that are above and submerged below the liquid level to determine the resistance ratios or fractions equivalent to the respective longitudinal portions of the sensor 57. Summing the respective resistance ratios or fractions is equivalent to the resistance measured by the intermediate sensor 57, a portion of which is submerged in the liquid which is accounted for by the respective longitudinal portions applied to the resistances of the upper and lower sensors 65, 67, as indicated by Equation (2) herein below.

Each of the sensors 57, 65, 67 responds by having a specific resistance corresponding to the respective temperature to which the sensor is exposed. For the small difference in temperature needed to make measurements (less than 5° F.), the responses of the sensors 57, 65, 67 are linear. The processor 70 makes four measurements at the sensors 57, 65, and 67 which are connected in series in the order: sensor 67 to sensor 57 to sensor 65. The measurements of resistance are made by a Digital to Analog Converter (A/D converter). Each of the resistors of these three sensors 57, 65 and 67 is energized by low voltage source applied at the top of the sensor 65. The four measurements which the A/D converter will make are: reference to ground (bottom of the sensor 67), at the node between the sensors 67 and 57, at the node between the sensors 65 and 57, and finally at the reference which is the top of the sensor 65. The reference will represent the full count of the A/D converter. The bottom of the sensor 67 will represent a zero count of the A/D converter. Between the full and zero count, the measurements made at the two remaining nodes may be used directly to determine the relative resistances of the sensors 65, 67 and 57. Accordingly, the respective absolute temperatures or resistances of the sensors 57, 65 and 67 are not required for determining the liquid level, i.e., the elevation of the liquid upper surface 25. The processor 70, when making the three measurements for sensors 57, 65, 67, requires receipt only of the relative counts measured by each sensor. The processor 70 use these relative counts for its calculations. The absolute temperatures or resistances of the sensors 57, 65, 67 are not required for the liquid level measurements. for the liquid level measurements.

The processor 70 will use the following Equation (1) to calculate the level of the liquid in the vessel 22, i.e., the elevation of the liquid upper surface 25.

$$l = \frac{R_i - R_{vp}}{R_{lq'} - R_{vp'}}$$    Eq. (1)

where l=number of "increments" between lower end 75 of the sensor 57 and liquid upper surface 25;

L=total number of "increments" between upper and lower ends 72 and 75 ends of the sensor 57 (any number of increments are possible, higher number increases resolution of calculation and the actual count is arbitrary and determined only by resolution requirements);

$R_i$=resistance of intermediate sensor 57;

$R_{vp}$=resistance of upper sensor 65 without scaling;

$R_{vp'}$=resistance of upper sensor 65 at the observed temperature when exposed to vapor only, scaled by dividing by the total number of "increments"; and $R_{lq'}$=resistance of lower sensor 67 at the observed temperature when exposed to liquid only, scaled by dividing by the total number of "increments".

A simplified example of the solution of Equation (1) follows.

Assume that the resistance (temperature) of the upper sensor 65 measured in the vapor after heating the sensor 67 measured in the liquid is 100 Ω, and the resistance (temperature) of the intermediate sensor 57 is 108 Ω.

|  | $R_i$ | $l \times R_{lq'}$ | $(L-l) \times R_{vp'}$ |
|---|---|---|---|
| $R_{vp}$ = 120 Ω |  |  |  |
| 0 |  |  |  |
|  | 100.1 to 102 Ω | 9 × 10 Ω | 1 × 12 Ω |
|  | 102.1 to 104 Ω | 8 × 10 Ω | 2 × 12 Ω |
| Vapor | 104.1 to 106 Ω | 7 × 10 Ω | 3 × 12 Ω |
| Resistance measured | 106.1 to 108 Ω | 6 × 10 Ω | 4 × 12 Ω |
|  | 108.1 to 110 Ω | 5 × 10 Ω | 5 × 12 Ω |
|  | 110.1 to 112 Ω | 4 × 10 Ω | 6 × 12 Ω |

-continued

|  | $R_i$ | $1 \times R_{lq'}$ | $(L-l) \times R_{vp'}$ |
|---|---|---|---|
| Liquid | 112.1 to 114 Ω | 3 × 10 Ω | 7 × 12 Ω |
|  | 114.1 to 116 Ω | 2 × 10 Ω | 8 × 12 Ω |
|  | 116.1 to 118 Ω | 1 × 10 Ω | 9 × 12 Ω |
|  | 118.1 to 120 Ω | 0 × 10 Ω | 10 × 12 Ω |
| O |  |  |  |
| $R_{lq}$ = 100 Ω |  |  |  |

In this example, assume that the upper sensor 65 at the top of the housing 30 measures 120 Ω, the lower sensor 67 at the bottom of the housing 30 measures 100 Ω and the intermediate sensor 57 measures 108 Ω. The sensor 57 may be arbitrarily divided into ten increments of length. Each increment of length of the sensor 57 at the vapor temperature will be $R_{vp'}$=(120 Ω/10)=12 Ω and $R_{lq'}$=(100 Ω/10)=10 Ω.

The depth of the liquid l will be found by determining what ratio of $R_{vp'}+R_{lq'}$ at l will equal the measured resistance $R_i$=108 Ω, the solution is provided by the following Equation (2):

$$108 \, \Omega = 10\Omega \times l + 12 \, \Omega \times (10-l) \qquad \text{Eq. (2)}$$

Solving for l results in l=6, which is the level of the liquid, i.e., the elevation of the liquid upper surface 25.

An alternative second method, which will yield similar results for the detector system 20, is based on the constant heat rise ΔT which results from a specific and constant amount of heat (Joules) being added to the housing 30 by the heater 40 over a discrete period of time. Such added heat will be distributed equally throughout the entire length of the housing 30, i.e., to all segments of the housing 30. This method advantageously uses this equal distribution of the heat added by the heater 40, and the temperature increase which results only if the heat added by the heater 40 is allowed to accumulate in the segment(s) of the sensor 57 exposed to the vapor and not exposed to the liquid. Heat added to the other segment(s) of the housing 30 exposed to the liquid will cause boiling of the liquid and the associated removal of the heat added, thereby resulting in a very small temperature increase below the liquid level. This method does not require upper and lower sensors 65 and 67 at, respectively, the top and bottom of the housing 30.

The second method is based on the sensor 57 having a resistance which, when heat is added to the sensor, increases by ΔR in direct relation to the increase in temperature, ΔT. The increase in resistance, ΔR, may be determined from the geometry of the sensor 57. Furthermore, the ΔR will reflect only the temperature rise in the part of the intermediate sensor 57 that is above the liquid level 25.

This second method includes measuring the resistance of the intermediate sensor 57 when the entire sensor is exposed to gas, air or vapor to establish a value $R_{i1/ref}$. Then, a known quantity of heat, $Q_{ref}$, is added to the sensor 57 by the heater 40 with the entire sensor still exposed to vapor thereby causing the resistance of the sensor to increase to a value $R_{i2/ref}$. The increase in resistance, $\Delta R_{ref}$, is determined according to Equation (3):

$$\Delta R_{ref}=R_{i2/ref}-R_{i1/ref} \qquad \text{Eq. (3)}$$

The $\Delta R_{ref}$, calculated according to Equation (3), is then scaled by dividing it by the number of increments to establish a $\Delta R_{ref}'$ corresponding to the known quantity of heat, $Q_{ref}$. The $\Delta R_{ref}$ may also be determined from the manufacturing and calibration process.

The depth of the liquid in the vessel 22 may then be determined from the intermediate sensor 57 supported in the vessel 22 by applying the known quantity of heat, $Q_{ref}$, to the sensor and measuring the resistance thereof, $R_{i2/vessel}$. The increase in resistance, $\Delta R_{vessel}$, is determined according to the following Equation (4):

$$\Delta R_{vessel}=R_{i2/vessel}-R_{i1/ref} \qquad \text{Eq. (4)}$$

The depth of the liquid in the vessel, relative to the lower end 75 of the sensor 57, may be calculated according to the following Equation (5):

$$l=10-(\Delta R_{vessel}/\Delta R_{ref}') \qquad \text{Eq. (5)}$$

Equation (5) is based on 10 "increments", according to which $\Delta R_{ref}'$ is obtained by dividing $\Delta R_{ref}$ by "10". Correction factors may be added to account for the absorption of heat from the vapor into the liquid and the residual heat in the sensor 57 below the liquid upper surface 25 at the time the resistance of the sensor 57, $R_{i2/vessel}$, is measured.

An alternative third method for the determination of the liquid level, i.e., the elevation of the liquid upper surface 25, is possible if the temperatures of the liquid and vapor in the vessel 22 are significantly different, without the addition of heat by the heater 40. Such a temperature difference, without such addition of heat, is rare and not normal. Nevertheless, such a condition is possible and makes unnecessary the addition of heat by the heater 40 to the sensor 57 to make a liquid level determination. Such a determination may be based on the same Equation (1) from above:

$$l = \frac{R_i - R_{vp}}{R_{lq'} - R_{vp'}} \qquad \text{Eq. (1)}$$

where l=number of "increments" between lower end 75 of the sensor 57 and liquid upper surface 25;

L=total number of "increments" between upper and lower ends 72 and 75 ends of the sensor 57 (any number of increments are possible, higher number increases resolution of calculation and the actual count is arbitrary and determined only by resolution requirements);

$R_i$=resistance of intermediate sensor 57;

$R_{vp}$=resistance of upper sensor 65 without scaling;

$R_{vp'}$=resistance of upper sensor 65 at the observed temperature when exposed to vapor only, scaled by dividing by the total number of "increments"; and $R_{lq'}$=resistance of lower sensor 67 at the observed temperature when exposed to liquid only, scaled by dividing by the total number of "increments".

Equation (1) in this third method is used to calculate the liquid level in the same manner as for the previous method. This third method has a limitation in that, if the temperature of the liquid and vapor in the vessel 22 are equal, then the denominator of Equation (1) becomes zero.

The processor 70 is programmed to determine the elevation of the liquid upper surface 25 relative to the upper and lower ends 72, 75 of the sensor 57, and to generate an electrical signal defining an elevation signal indicative of the determined elevation. The processor 70 may determine the elevation according to the foregoing equations.

Alternatively, the processor 70 may be programmed to determine the elevation of the liquid upper surface 25 relative to the upper and lower ends 72, 75 by calculating a "temperature index" proportional to the temperature signal received the intermediate sensor 57. The temperature index indicates the temperature increase detected by the sensor resulting from actuation of the heater 40. This, in turn, indicates the portion of liquid or vapor adjacent to the sensor 57, because a large portion of liquid adjacent to the sensor 57 results in a lower temperature increase as compared to the temperature increase if a large portion of vapor is adjacent to the sensor 57.

The processor 70 is programmed further to compare the temperature index to a "reference" and to generate an electrical signal defining an elevation signal indicative of the elevation of the liquid upper surface 25 relative to the upper and lower ends 72, 75 of the sensor 57.

The processor 70 may be programmed to determine the temperature index by various methods, each based on the temperature signal received from the sensor 57. The processor 70 is programmed further such that the reference corresponds to the temperature index. Each of these methods involves the processor 70 interrogating, measuring and interpreting the temperature signals from the sensor 57.

For example, the temperature index may be the temperature detected by the intermediate sensor 57 at a specific time after actuation of the heater 40. A corresponding reference may be a series of temperatures which are known to be the temperatures which would be detected by the intermediate sensor 57 if the liquid upper surface 25 is present at various elevations of the sensor. Such reference temperatures may be determined, for example, empirically prior to operation of the system 20 to determine an unknown liquid level. The reference temperature to which the temperature detected by the sensor 57 most closely corresponds indicates the elevation of the liquid upper surface 25.

Alternatively, the reference temperatures may determined during operation of the system 20 to determine an unknown liquid level. For example, reference temperatures may be determined by ascertaining the temperatures detected by the upper and lower sensors 65, 67 located at elevations within the vessel 22 which are known to have liquid and vapor, respectively, thereby to determine reference "liquid" and "vapor" temperatures. If the temperature detected by the intermediate sensor 57, after heat is applied by the heater 40, is approximately equal to the reference "vapor" temperature detected by the upper sensor 65, then the processor 70 determines that the entire length of the sensor 57 is exposed to vapor and, therefore, the liquid upper surface 25 is below the lower end 75. If the temperature detected by the intermediate sensor 57, after heat is applied by the heater 40, is approximately equal to the reference "liquid" temperature detected by the lower sensor 67, then the processor 70 determines that the entire length of the sensor 57 is exposed to liquid and, therefore, the liquid upper surface 25 is above the upper end 72.

If the temperature detected by the intermediate sensor 57 is between the temperatures detected by the upper and lower sensors 65, 67, then the elevation of the liquid upper surface 25 is determined by the processor 70 to be between the upper and lower ends 72, 75. Further specificity in the elevation of the liquid upper surface 25 indicated by the temperature may be obtained by comparing the temperature detected by the sensor 57 to the temperatures detected by the upper and lower sensors 65, 67. For example, if the temperature detected by the intermediate sensor 57 is closer to the reference "vapor" temperature detected by the upper sensor 65, as compared to the reference "liquid" temperature detected by lower sensor 67, then the liquid upper surface 25 is closer to the lower end 75 as compared to the upper end 72.

The numerical ratios between the temperature detected by the intermediate sensor 57 and the temperatures detected by the upper and lower sensors 65, 67 may provide further specificity of the elevation of the liquid upper surface 25 relative to the upper and lower ends 72, 75. For example, if the upper sensor 65 detects a temperature of 60 degrees, the lower sensor 67 detects a temperature of 20 degrees, and the intermediate sensor 57 detects a temperature of 40 degrees, then the processor 70 determines the elevation of the liquid upper surface 25 to be midway between the upper and lower ends 72, 75. As another example, if the upper sensor 65 detects a temperature of 60 degrees, the lower sensor 67 detects a temperature of 20 degrees, and the intermediate sensor 57 detects a temperature of 30 degrees, then the processor 70 determines the elevation of the liquid upper surface 25 to be above the lower end 72 at a distance of ¼ the total distance between the upper and lower ends 72, 75.

Using the temperatures detected by the upper and lower sensors 65, 67 as the "reference" temperatures against which the temperature detected by the intermediate sensor 57 is compared is related to the methods using the foregoing Equations (1) to (5) in that these equations compare $R_I$, to $R_{vp}$, and $R_i$ to $R_{lq}$. $R_i$, $R_{vp}$ and $R_{lq}$ are indicative of the temperatures detected by the intermediate, upper and lower sensors 57, 65, 67, respectively.

Alternatively, the temperature index may be the change in the temperatures detected by the intermediate sensor 57, between two specific times, such as the time just before actuation of the heater 40, and a specific time after actuation of the heater. A corresponding reference may be the temperature changes which are known to be the changes which would be detected by the sensor 57 if the liquid upper surface 25 is present at various elevations between the upper and lower ends 72, 75. Such reference changes may be determined, for example, empirically prior to operation of the system 20 to determine an unknown liquid level. If the change in temperature detected by the sensor 57 is approximately equal to a reference change for a particular elevation of the liquid upper surface 25, then the processor 70 determines that the liquid upper surface 25 has that particular elevation.

Alternatively, the reference change may determined during operation of the system 20 to determine an unknown liquid level. For example, the reference change may be determined by ascertaining the changes in temperatures detected by the upper and lower sensors 65, 67 located at elevations within the vessel 22 which are known to have liquid and vapor, respectively, thereby to determine reference "liquid" and "vapor" changes. If the temperature change detected by the intermediate sensor 57 is approximately equal to the reference "liquid" change, then the processor 70 determines that the entire length of the sensor 57 is exposed to liquid and, therefore, the liquid upper surface 25 is above the upper end 72. If the temperature detected by the intermediate sensor 57 is approximately equal to the reference "vapor" change, then the processor 70 determines that the entire length of the sensor 57 is exposed to vapor and, therefore, the liquid upper surface 25 is below the lower end 75.

If the temperature change detected by the intermediate sensor 57 is between the temperature changes detected by the upper and lower sensors 65, 67, then the elevation of the liquid upper surface 25 is determined by the processor 70 to be between the upper and lower ends 72, 75. Further specificity in the elevation of the liquid upper surface 25 indicated by the temperature change may be obtained by comparing the temperature change detected by the intermediate sensor 57 to the temperature changes detected by the upper and lower sensors 65, 67. For example, if the temperature change detected by the intermediate sensor 57 is closer to the reference "vapor" change detected by the upper sensor 65, as compared to the reference "liquid" change detected by lower sensor 67, then the liquid upper surface 25 is closer to the lower end 75 as compared to the upper end 72. The numerical ratios between the temperature change detected by the intermediate sensor 57 and the temperature changes detected by the upper and lower sensors 65, 67 may provide further specificity of the elevation of the liquid upper surface 25 relative to the upper and lower ends 72, 75.

A further alternative is for the temperature index to be the rate of change in temperature detected by the intermediate sensor 57 relative to a specific time period after actuation of the heater 40. A corresponding reference may be the temperature change rates which are known to be the changes which would be detected by the sensor 57 if liquid upper surface 25 is present at various elevations between the upper and lower ends 72, 75. Such reference change rates may be determined, for example, empirically prior to operation of the system 20 to determine an unknown liquid level. If the rate of change in temperature detected by the sensor 57 is approximately equal to a reference change rate for a particular elevation, then the processor 70 determines that the liquid upper surface 25 has that particular elevation.

Alternatively, the reference change rate may determined during operation of the system 20 to determine an unknown liquid level. For example, the reference change rate may be determined by ascertaining the rates of change in temperatures detected by the upper and lower sensors 65, 67 located at elevations within the vessel 22 which are known to have liquid and vapor, respectively, thereby to determine reference "liquid" and "vapor" change rates. If the rate of change in temperature detected by the intermediate sensor 57 is approximately equal to the reference "liquid" change rate, then the processor 70 determines that the entire length of the sensor 57 is exposed to liquid and, therefore, the liquid upper surface 25 is above the upper end 72. If the rate of change in temperature detected by the sensor 57 is approximately equal to the reference "vapor" change rate, then the processor 70 determines that the entire length of the sensor 57 is exposed to vapor and, therefore, the liquid upper surface 25 is below the lower end 75.

If the temperature change rate detected by the intermediate sensor 57 is between the temperature change rates detected by the upper and lower sensors 65, 67, then the elevation of the liquid upper surface 25 is determined by the processor 70 to be between the upper and lower ends 72, 75. Further specificity in the elevation of the liquid upper surface 25 indicated by the temperature change rate may be obtained by comparing the temperature change rate detected by the intermediate sensor 57 to the temperature change rates detected by the upper and lower sensors 65, 67. For example, if the temperature change rate detected by the intermediate sensor 57 is closer to the reference "vapor" change rate detected by the upper sensor 65, as compared to the reference "liquid" change rate detected by lower sensor 67, then the liquid upper surface 25 is closer to the lower end 75 as compared to the upper end 72. The numerical ratios between the temperature change rate detected by the intermediate sensor 57 and the temperature change rates detected by the upper and lower sensors 65, 67 may provide further specificity of the elevation of the liquid upper surface 25 relative to the upper and lower ends 72, 75.

The one or more time periods during which the temperature change rate for the sensor 57, or for the sensors 57, 65, 67, is determined may be sufficiently close in time to the actuation of the heater 40, so that the change rate indicates a relatively fast increase in the temperature for the vapor and a relatively slow increase in the temperature for the liquid.

Alternatively, the one or more time periods during which the temperature change rate for the sensor 57, or for the sensors 57, 65, 67, is determined may be sufficiently after the actuation of the heater 40, so that the change rate indicates a relatively fast decrease in the temperature for vapor and a relatively slow decrease in the temperature for liquid. The reference change rate is determined so as to account for the proximity in time of the determination of the temperature change rate for the sensor 57, or for the sensors 57, 65, 67, to the actuation of the heater 40.

The processor 70 in FIG. 1 is electrically connected, by the conduit 47 to the heater 40 for controlling operation of the heater. The processor 70 is also electrically connected to the power supply 55 by an electrical conduit 77 which may comprise one or more wires.

The system 20 includes an interface 80 electrically connected by an electrical conduit 82 to the processor 70 for receiving the elevation signals from the processor. The conduit 82 may comprise one or more wires. The interface 80 uses the elevation signals as the basis for communicating to the user the level of the liquid upper surface 25 relative to the lower end 75 of the intermediate sensor 57. The interface 80 is electrically connected to the power supply 55 by an electrical conduit 85 which may comprise one or more wires.

The interface 80 may be electrically connected to communication devices that will facilitate the remote reporting to another location of the liquid level, i.e., elevation of the liquid upper surface 25, in the vessel 22. Examples of such communication devices include a phone line with automatic dial up and/or answer capabilities using a modem or DTMF tone exchange to communicate the identification, such as a customer number, of the vessel 22 and the associated liquid level, i.e., elevation of the liquid upper surface 25, in, for example, mm or inches, or the associated liquid volume in, for example, liters or gallons. The interface 80 could also be a direct connection such as 4 to 20 ma loop for instrumentation. In all cases, the interface 80 is capable of resolving the liquid level, i.e., elevation of the liquid upper surface 25, in the vessel 22 to one level, i.e., elevation, in as low as ten levels for less demanding systems, to one level, i.e., elevation, in up to approximately 5000 levels allowing close monitoring of the liquid level in the vessel.

Equations (1) to (5) each assume that the sensors 57, 65 and 67 are about 100 $\Omega$ at 25° C., and that the range of resistance change from −40° F. to +120° F. is about 65 $\Omega$. Equations (1) to (5) yield accurate results with temperature differences (proportional to AR) as small as 0.5° F. The temperature measurements (proportional to "R") are possible with a resolution of 0.01° F. which is well within the range of known technology.

Figure 4:
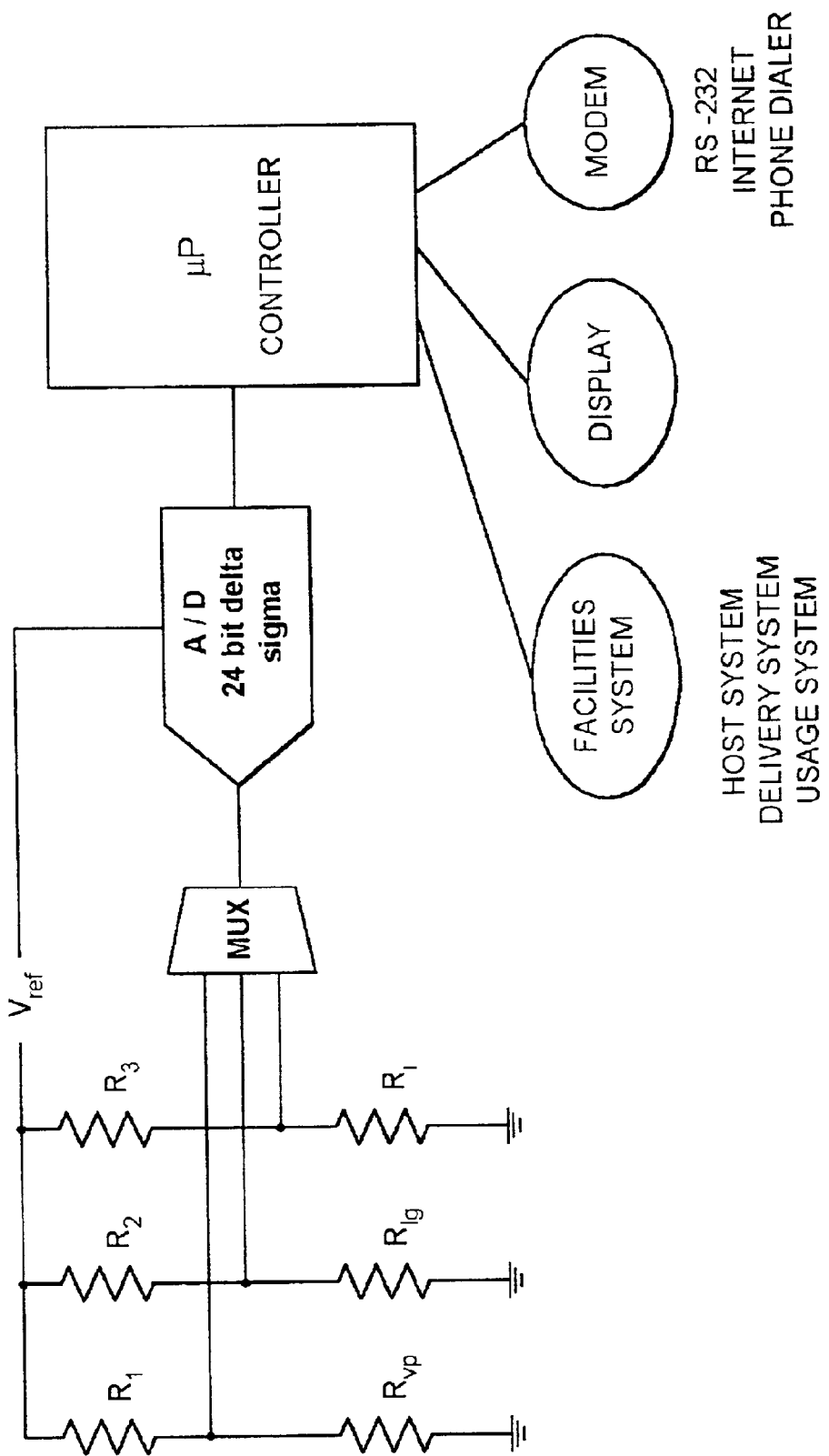
FIG. 4 is a block diagram of a first circuit for processing the temperature signals generated by the sensors of FIG. 1 for determining the elevation of the liquid upper surface.
Figure 5:
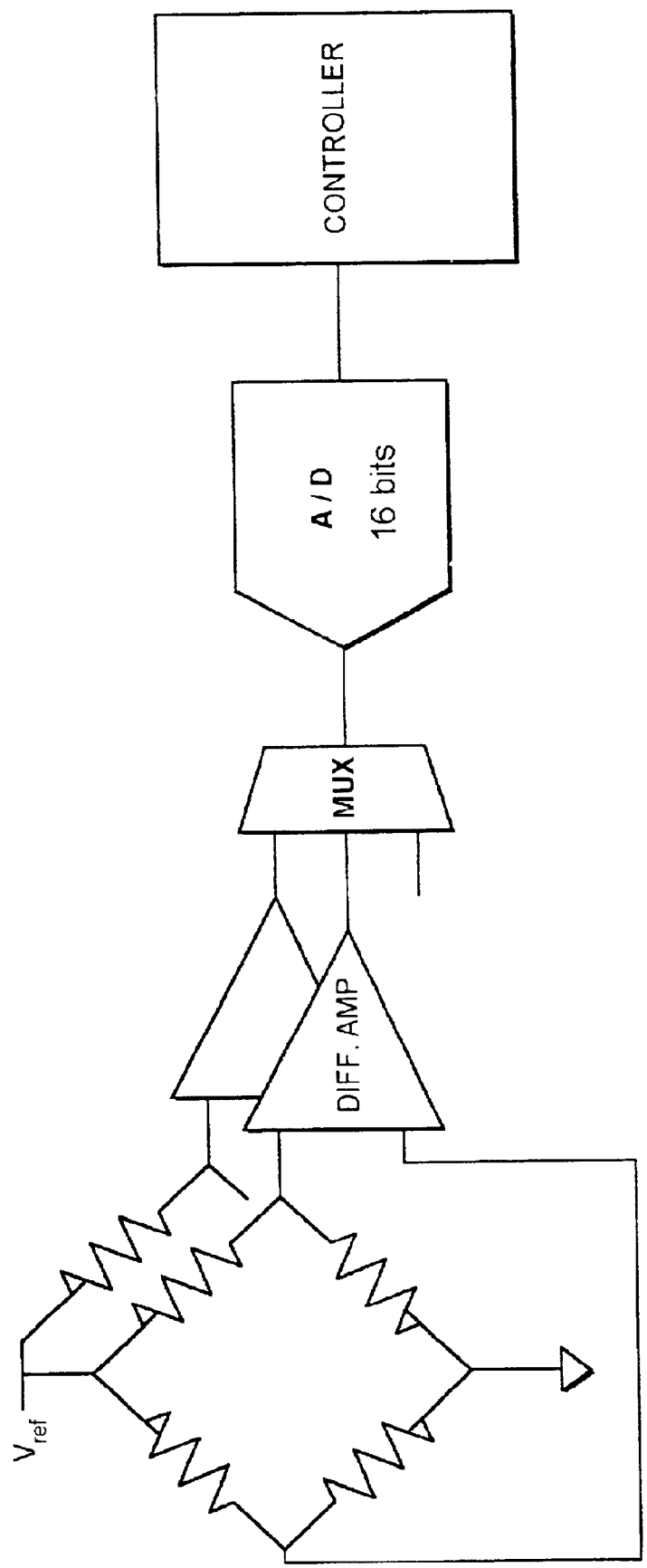
FIG. 5 is a block diagram of a second circuit for processing using a full bridge and an analog-to-digital (A/D) converter with less resolution to determine the electrical signals generated by the sensors of FIG. 1 for determining the elevation of the liquid upper surface.

FIGS. 4 and 5 show block diagrams for the system 20. The system 20 provides high-resolution measurements by utilizing inexpensive components which are known. An example of a component which facilitates sufficient resolution is a digitizing element.

The first implementation of the system 20, shown schematically in FIG. 4, uses a front end that is capable of accepting the full input range and resolving the data from the full signal. Component elements that resolve an analog signal into a full 24 bits are known. This will resolve a signal into one part in over 16 million. If six bits are allocated to system errors (noise, temperature effects, component tolerances, etc.) and common mode cancellation, then 18 bits of data remain available to provide sufficient resolution to measure a 0.0005 $\Omega$ change in resistance of the sensors 57, 65, 67.

The second implementation of the system 20, shown schematically in FIG. 5, includes an A/D with limited resolution (16 bits) and the addition of differential amplifier circuits to remove the common mode portion of the signal, facilitating accurate measurements with limited hardware resolution.

A vessel 22 which is properly filled with propane has, at the upper portion of its interior, about 20% of its volume reserved for vapor. Accordingly, the elevation of the upper end 72 of the sensor 57 and the upper sensor 65 of the housing 30 will be equal to approximately the 85% full level of the vessel 22. The elevation of the lower end 75 of the sensor 57 and the lower sensor 67 of the housing will be approximately one to two inches above the bottom of the vessel 22. The lower end of the housing 30 will not contact the bottom of the vessel 22 because the temperature of the vessel is required to not be detected by the sensors 57, 65, 67. The sensors 57, 65, 67 measure the temperature of preferably only the liquid and vapor in the vessel 22.

Since the elements of the housing 30 are conductive, both electrically and thermally, a correction may be applied to the measurements and/or the calculations based thereon to account for the temperature change between the liquid and vapor phase over a finite dimension of the housing 30.

Preferably, the system 20 is operated to measure the elevation of the liquid upper surface 25 when the liquid (such as propane) is at the critical pressure. However, the system 20 may be so operated if the liquid is not at a critical pressure. The accuracy of the system 20 may be limited if thermoclines are present in the liquid in the vessel 22. If such thermoclines are present in the liquid, then the accuracy of the system 20 may be increased by using a plurality of discrete intermediate sensors 57 along the length, i.e., longitudinal axis, of the housing 30.

The entire disclosures of U.S. patent application Ser. No. 09/368,337, filed Aug. 3, 1999, and U.S. Patent Application Ser. No. 09/800,259 Attorney Docket No. F.006, filed Mar. 6, 2001, titled "Internal Liquid Level Detector System", naming as inventor "Charles D. Snelling", are each hereby incorporated by reference herein.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A system for detecting the level of liquid in a vessel, comprising:

a detector assembly including a thermally conductive substrate, a heater mounted on said substrate such that said heater is thermally coupled to the interior of the vessel, said heater being able to be actuated to add heat to the surface of the substrate thermally coupled to the interior of the vessel, and a sensor mounted on said substrate in proximity to said heater such that discrete elevations of the interior of the vessel are thermally coupled to corresponding longitudinal portions of said sensor to generate an electrical signal defining a temperature signal, said correspondence being incrementally continuous such that the elevations corresponding to said portions of said sensor increase from one to the other of the ends of said sensor, said sensor being able to be actuated to detect the temperature in the vessel in proximity to the sensor indicative of the temperature detected by said sensor, said sensor having a vertical dimension sufficiently large such that sa in temperature signal will vary in proportion to said longitudinal portion of said sensor thermally coupled to the liquid;

a processor electrically connected to said sensor for receiving said temperature signal after actuation of said heater, said processor being programmed to use said temperature signal to calculate the elevation of the upper surface of the liquid in the vessel thereby to generate an electrical signal defining an elevation signal indicative of the elevation of the liquid upper surface relative to the lower end of said sensor;

an interface electrically connected to said processor for receiving said elevation signal for use as the basis for communicating to the user the elevation of the liquid upper surface; and a power supply electrically connected to said heater, sensor, processor, and interface, and wherein said sensor comprises a potentiometer wherein the resistance to electrical conductivity of said sensor varies in proportion to the temperature detected by it, said temperature signal being equal to said resistance, said programming of said processor comprising using said temperature signal to measure said resistance of said sensor, said programming further comprising using said resistance to calculate the elevation of the liquid upper surface, wherein said sensor comprises a potentiometer wherein the resistance to electrical conductivity of said sensor varies in proportion to the temperature detected by it, said temperature signal being equal to said resistance, said programming of said processor comprising using said temperature signal to measure said resistance of said sensor, said programming further comprising using said resistance to calculate the elevation of the liquid upper surface, wherein said sensor is defined by an intermediate sensor, said system further comprising: an upper sensor mounted on said substrate adjacent to the upper end of said intermediate sensor; and a lower sensor adjacent to the lower end of said intermediate sensor, said upper and lower sensors being thermally coupled to the interior of the vessel to detect the respective temperatures therein in proximity to said upper and lower sensors, said upper and lower sensors being able to be actuated to produce respective electrical signals defining temperature signals indicative of the respective temperatures detected by them, said upper and lower sensors each comprising a potentiometer wherein the resistance to electrical conductivity of each of said upper and lower sensors varies in proportion to the respective temperatures detected by them, said temperature signals of said upper and lower sensors being equal to said respective resistance values thereof, said processor being further programmed to calculate the distance between said lower sensor and the liquid upper surface according to the following equation:

$$l = \frac{R_i - R_{vp}}{R_{1q} - R_{vp}}$$

where l=longitudinal fraction of said intermediate sensor below said liquid upper surface;

$R_i$=resistance of said intermediate sensor;

$R_{vp}$=resistance of said upper sensor when exposed to vapor only; and $R_{lq}$=resistance of said lower sensor when exposed to liquid only, said processor being further programmed to calculate the vertical component of "l" for use as the basis for said generation of said elevation signal.

2. A system as set forth in claim 1, wherein said intermediate sensor has a longitudinal axis, said intermediate sensor being oriented such that said longitudinal axis is vertical, said processor being further programmed such that said vertical component equals "l".

3. A system for detecting the level of liquid in a vessel, comprising:

a detector assembly including a thermally conductive substrate, a heater mounted on said substrate such that said heater is thermally coupled to the interior of the vessel, said heater being able to be actuated to add heat to the surface of the substrate thermally coupled to the interior of the vessel, and a sensor mounted on said substrate in proximity to said heater such that discrete elevations of the interior of the vessel are thermally coupled to corresponding longitudinal portions of said sensor to generate an electrical signal defining a temperature signal, said correspondence being incrementally continuous such that the elevations corresponding to said portions of said sensor increase from one to the other of the ends of said sensor, said sensor being able to be actuated to detect the temperature in the vessel in proximity to the sensor indicative of the temperature detected by said sensor, said sensor having a vertical dimension sufficiently large such that said temperature signal will vary in proportion to said longitudinal portion of said sensor thermally coupled to the liquid;

a processor electrically connected to said sensor for receiving said temperature signal after actuation of said heater, said processor being programmed to use said temperature signal to calculate the elevation of the upper surface of the liquid in the vessel thereby to generate an electrical signal defining an elevation signal indicative of the elevation of the liquid upper surface relative to the lower end of said sensor;

an interface electrically connected to said processor for receiving said elevation signal for use as the basis for communicating to the user the elevation of the liquid upper surface;

a power supply electrically connected to said heater, sensor, processor, and interface, and wherein said sensor comprises a potentiometer wherein the resistance to electrical conductivity of said sensor varies in proportion to the temperature detected by it, said temperature signal being equal to said resistance, said programming of said processor comprising using said temperature signal to measure said resistance of said sensor, said programming further comprising using said resistance to calculate the elevation of the liquid upper surface, wherein said sensor comprises a potentiometer wherein the resistance to electrical conductivity of said sensor varies in proportion to the temperature detected by it, said temperature signal being equal to said resistance, said programming of said processor comprising using said temperature signal to measure said resistance of said sensor, said programming further comprising using said resistance to calculate the elevation of the liquid upper surface, wherein said sensor is defined by an intermediate sensor, said system further comprising: an upper sensor mounted on said substrate adjacent to the upper end of said intermediate sensor; and a lower sensor adjacent to the lower end of said intermediate sensor, said upper and lower sensors being thermally coupled to the interior of the vessel to detect the respective temperatures therein in proximity to said upper and lower sensors, said upper and lower sensors being able to be actuated to produce respective electrical signals defining temperature signals indicative of the respective temperatures detected by them, said upper and lower sensors each comprising a potentiometer wherein the resistance to electrical conductivity of each of said upper and lower sensors varies in proportion to the respective temperatures detected by them, said temperature signals of said upper and lower sensors being equal to said respective resistance values thereof, said processor being further programmed to calculate the distance between said lower sensor and the liquid upper surface according to the following equation:

$$l = \frac{R_i - R_{vp}}{R_{lq'} - R_{vp'}}$$

Where l=number of increments between a lower end of said intermediate sensor and the liquid upper surface;

L=total number of increments between an upper end and said lower end of said intermediate sensor (any number of increments are possible, higher number increases resolution of calculation and the actual count is arbitrary and determined only by resolution requirements)

$R_i$=resistance of said intermediate sensor;

$R_{vp}$=resistance of said upper sensor without scaling;

$R_{vp'}$=resistance of said upper sensor at the observed temperature when exposed to vapor only, scaled by dividing by the total number of increments; and $R_{lq'}$=resistance of said lower sensor at the observed temperature when exposed to liquid only, scaled by dividing by the total number of increments;

said processor being further programmed to calculate the vertical component of "l" for use as the basis for said generation of said elevation signal.

4. A system as set forth in claim 3, wherein said intermediate sensor has a longitudinal axis, said intermediate sensor being oriented such that said longitudinal axis is vertical, said processor being further programmed such that said vertical component equals "l".

* * * * *